United States Patent [19]

Tillman

[11] 4,244,613

[45] Jan. 13, 1981

[54] FUSE HOLDER EXTRACTOR AND REPLACER TOOL

[76] Inventor: Lattie M. Tillman, 300 Peaceful Ridge Rd., Davie, Fla. 33330

[21] Appl. No.: 883,524

[22] Filed: Mar. 6, 1978

[51] Int. Cl.[2] .......................... B25B 27/14; B25J 1/00

[52] U.S. Cl. ...................................... 294/19 R; 81/3.8

[58] Field of Search .......................... 294/19 R, 20–22; 81/3.8, 53.1

[56] References Cited

U.S. PATENT DOCUMENTS

| | | | |
|---|---|---|---|
| 1,111,380 | 9/1914 | Hanke | 81/3.8 |
| 1,752,575 | 4/1930 | Roselle | 81/3.8 |
| 1,853,598 | 4/1932 | Birkenmaier | 81/3.8 |
| 1,876,892 | 9/1932 | Fiske | 81/3.8 |
| 2,243,528 | 5/1941 | Grinnell | 294/19 R |
| 2,552,015 | 5/1951 | Quick | 294/19 R |

*Primary Examiner*—Johnny D. Cherry
*Attorney, Agent, or Firm*—Eugene F. Malin; Barry L. Haley

[57] ABSTRACT

A fuse holder manipulating tool for removing and replacing fuses held within holders used in electrical connections atop utility poles. More particularly, a tool comprised of a cylindrical body portion closed at one end and open at the other. The cylindrical body portion having a longitudinal opening running along at least one portion of the length of the cylindrical body and having a second longitudinal opening opposite the first opening with the second opening having a generally triangularly shaped flange portion extending outwardly from each edge of the first opening for guide purposes. The body portion has a generally U-shaped guide structure connected to it near its open end. A bar-like pin projects outwardly from the body portion adjacent the guide structure for connecting with an eye on the fuse. The tool is placed on the end of a long switch stick. The shape of the tool and positioning of components allow the tool to be used to position and manipulate the fuse holder easily.

7 Claims, 10 Drawing Figures

Fig. 5.
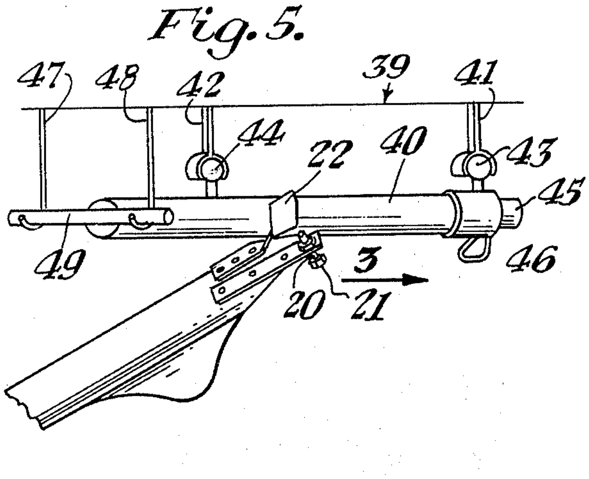
Fig. 6.
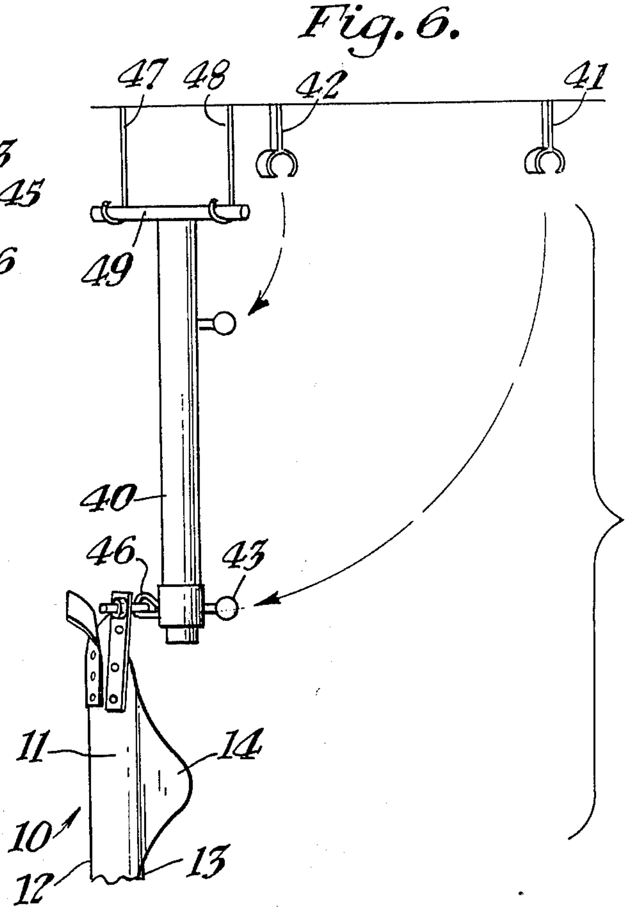
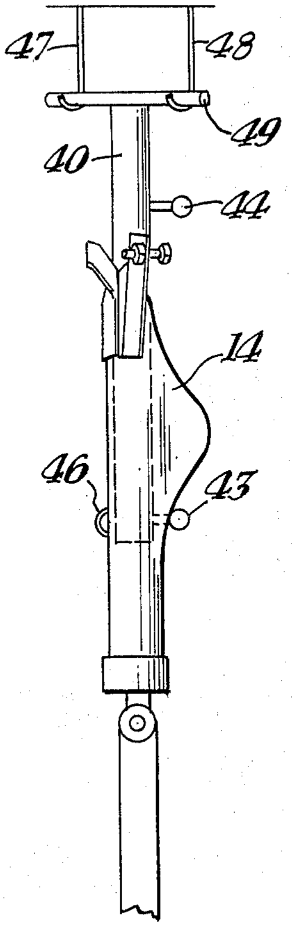
Fig. 7.
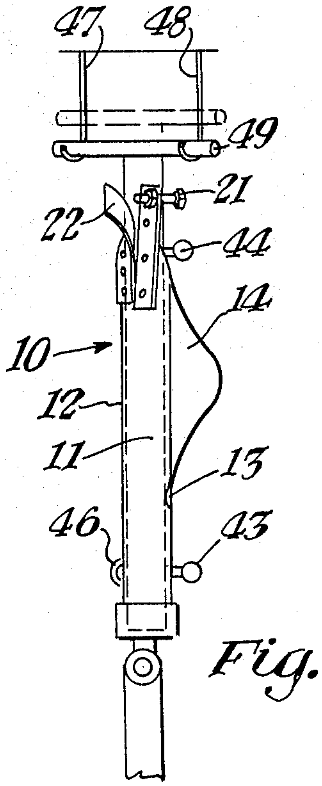
Fig. 8.
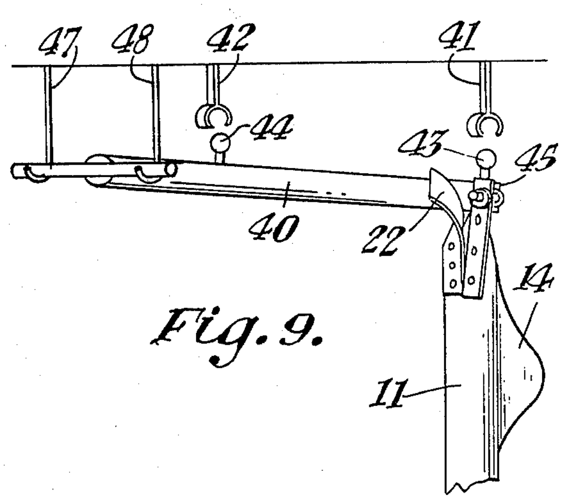
Fig. 9.

FUSE HOLDER EXTRACTOR AND REPLACER TOOL

BACKGROUND OF THE INVENTION

This device relates to the field of fuse holder handling devices and particularly to devices of this character for use in removing and replacing fuses in electrical circuitry atop utility poles.

The prior art reveals a variety of fuse manipulation devices for removing and replacing fuses while the user is at a distance from the fuse or fuse holder. Some devices grip the fuse holder and then pull it out, (See U.S. Pat. No. 1,430,053 to Bush) while other devices hook the fuse holder and pull it from its position (see U.S. Pat. 1,600,247 to Robinson). Such devices may be used in certain situations such as when the fuse holder is not positioned too far from the user attempting to remove it. However, when the fuse holder is 30-40 feet above the user atop a utility pole, the user must be particularly skillful with the device in order to be successful at removing and replacing a fuse holder within a reasonable length of time. Ring-like extensions were placed on the fuse holder and tools capable of utilizing the rings were developed (see U.S. Pat. No. 1,876,892 to Fiske). However, these devices also require skillful users with exceptional depth perception in order to be effectively used.

BRIEF SUMMARY OF THE INVENTION

The present invention provides a fuse manipulating tool which can be attached to the end of a long pole and used to disengage a fuse, extract blown fuses, and insert new fuses into electrical connections positioned on top of utility poles. The tool's body portion is cylindrical, closed at one end and open at the other. The closed end has connected to it a means for connecting the tool to a pole. The cylindrical body portion has a longitudinal first opening running along at least the greater portion of its length and a second slot-like opening opposite the other opening. The edges of the first opening each have a triangularly shaped flange portion extending outwardly from it for guide purposes. Positioned near the open end of the cylindrical body is a generally U-shaped guide means and an outwardly extending pin. The guide means may be a hemispherical band or flange connected near the open end of the cylindrical body or may be molded in the body. The guide means is positioned so that the U-shaped portion of said guide means faces away from the body of the tool. The U-shaped portion is used to slide over a fuse barrel. The pin portion is connected to the open end of the body to an elongated portion extending from the body of the tool. Said length of the elongated portion may run parallel to the length of the body of the tool with the end of said extension projecting just beyond the open end of the cylindrical body of the tool. The elongated portion may also be welded into the body of the tool.

In order to utilize the tool, its closed end is connected to a long pole via a connector means. The connection allows for angular movement between the tool and the pole. The pole must be sufficiently long to allow a user to reach the tool to a fuse holder positioned atop a utility pole. The tool may be utilized to remove the fuse holder when the fuse is blown or when it is not blown. When fuse is not blown, the user raises the tool up to the fuse holder and positions the generally U-shaped guide means against the cylindrical body of a fuse holder. The guide means may be positioned anywhere along the barrel of the fuse in the fuse holder and then the tool may be slid to the end of the fuse holder that has a ring extending from it. The user then turns the pole slightly, thus turning the pin portion of the tool positioned on its end into the ring. The twisting motion allows the outwardly extending pin on the tool to automatically pass through the ring extending from the fuse holder. Once the pin is in the ring, the user need only pull downward on the device, pulling one end of the fuse barrel free of its securing clips. The fuse barrel now hangs vertically from a bar attached to it at one end of the fuse holder. The bar lays horizontally across a series of hooks. The user then positions the open end of the cylindrical body under the fuse barrel and moves the tool upward. The fuse barrel then slides into the open cylinder and the bar may be lifted from the hooks, thus removing the fuse barrel and end portions completely and allowing it to be lowered to the ground.

Extensions or flanges protrude from the fuse holder adjacent the first opening that runs along at least the greater portion of the length of the tool's body portion. The extensions or flanges aid in guiding the fuse barrel into the fuse holder. The flanged end portions on the fuse barrel extend through the slots in the body of the tool. Once a fuse barrel and the end portions are lowered, the user may remove the fuse barrel and end portions from the tool and replace the fuse, if necessary. The fuse barrel and end portions are then placed back into the tool so that it may be raised into position for replacement atop the utility pole. The user raises the tool and forces the bar to connect to one end of the fuse barrel back on the rear hooks of the fuse holder and the tool is then lowered so that the fuse barrel slides out of the cylindrical body. Just as the fuse barrel moves out of the body of the tool, the tool is moved toward the connector means for the other end of the fuse barrel. The generally U-shaped device projects upwardly as well as outwardly. The U-shaped guide means is then almost automatically positioned along the barrel of the fuse and then slid along it toward the downward hanging end of the fuse, while lifting the tool upwardly. When properly positioned at the other end, the user then forces the fuse into the clips which securely hold it in a closed position.

In accordance with the disclosed structure and use, it is the primary object of this invention to provide a tool for opening, removing, and replacing electrical fuses atop of utility poles.

Another object is to provide such a tool that will allow a relatively unskilled user to perform such opening, removal, and/or replacement of fuses on top of utility poles, with relative ease.

Yet another object is to provide such a tool that will allow a single user to replace blown fuses atop telephone poles without the aid of other special equipment.

Still another object is to provide such a tool which is of simple, safe and economical construction and is much easier to utilize than the prior art fuse extractors.

Still, yet another object is to provide such a tool having a guide means which allows for easier fuse removal by relatively unskilled users.

Another object is to provide such a tool having a cylindrical body portion which eliminates the dropping of fuses during removal, thus providing a safer method of fuse removal.

These together with other objects and advantages will become apparent to those skilled in the art upon reading the details of construction and operation as more fully set forth hereinafter, reference being had to the accompanying drawings forming a part hereof, wherein like numerals refer to like parts throughout.

BRIEF DESCRIPTION OF THE DRAWINGS

FIG. 5 is an illustration of the tool moving along the fuse barrel toward the ring.

FIG. 6 is an illustration of the tool opening the fuse circuit with the pin in the ring.

FIG. 7 is an illustration with the fuse barrel half way in the tool.

FIG. 8 is an illustration with the fuse barrel all the way in the barrel to remove the fuse barrel from the fuse holder.

FIG. 9 is an illustration of the tool closing the fuse circuit.

DETAILED DESCRIPTION OF PREFERRED EMBODIMENTS

Before the present fuse manipulating tool is specifically described, it is to be understood that the invention is not limited to the particular arrangement of the parts here shown, as such devices may vary. It is also to be understood that the phraseology or terminology herein used is for the purposes of description of particular embodiments and not of limitation, as the scope of the present invention is denoted by the appended claims.

Figure 3:
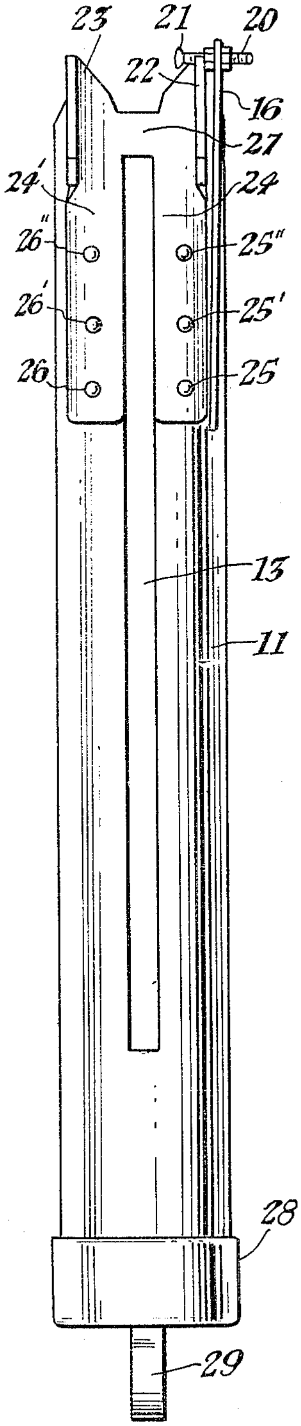
FIG. 3 is a rear view of the tool.
Figure 1:
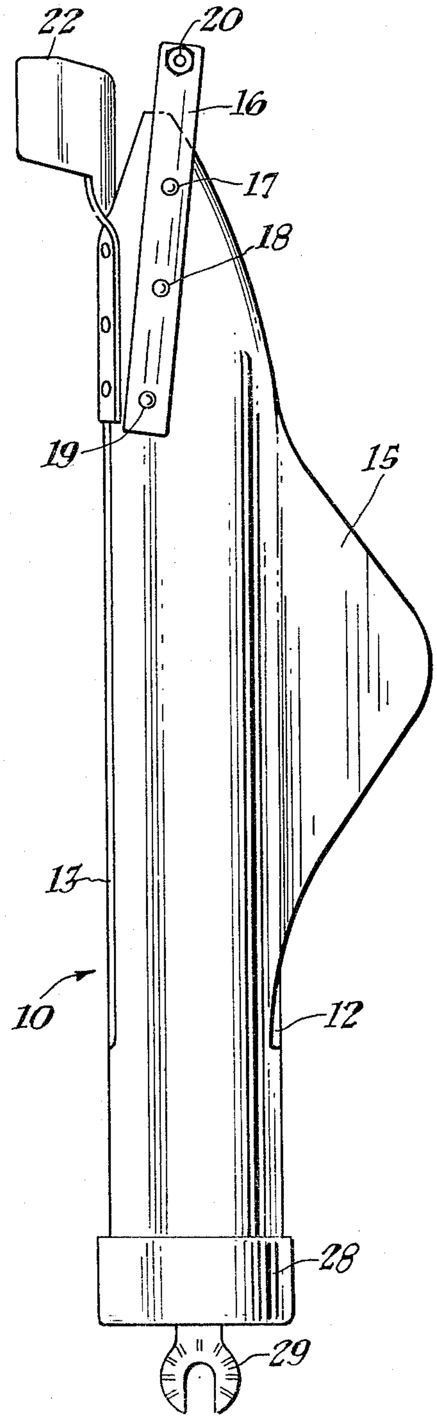
FIG. 1 is a side view of the tool.

Referring now to the drawings and to FIG. 1 in particular which shows a side view of the device or tool 10, the cylindrical body portion 11 is shown with slot openings 12 and 13 partially visable. The body 11 has triangularly shaped extensions 14 and 15 extending outwardly from the edges of opening 12. Extensions 14 and 15 act as guide means and may protrude outward parallel to each other or flare outward slightly away from each other. The extensions aid in placing the fuse barrel and end connections in the body 11. Extension 16 is connected to the body 11 via rivets 17, 18 and 19, or by other suitable means. Extension 16 may be molded into body 11. A bolt or pin 20 is shown in connection with and protruding through the end of extension 16 with the head 21 of the bolt 20 pointing inward toward the body 11. Two quarter sections or arms 22 and 23 connected on either side of slot 13 make up a generally U-shaped guide means. Section 22 is connected to the body 11 via hemispherical plate 24 and rivets 25, 25' and 25'' and section 23 is connected to the body 11 via plate 24' and rivets 26, 26', and 26'' as shown in FIG. 3. It should be noted that cross member 27 connects sections 22 and 23. The body 11 may be connected to pin 20 and arms 22–23 by other means such as by producing the entire device in one molded piece with no need to connect any additional attachments.

Figure 10:
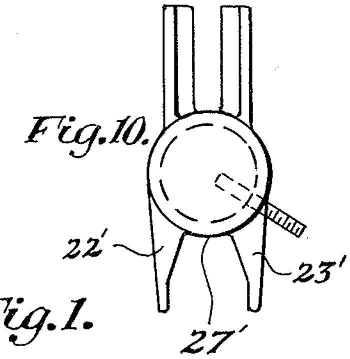
FIG. 10 is an illustration of a molded guide means and pin.

Arms 22, 23 and member 27 may be shaped as shown in FIG. 10, shows as 22', 23' and 27'.

Figure 2:
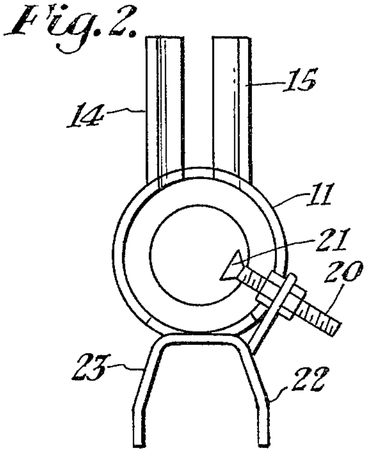
FIG. 2 is a top view of the tool.
Figure 4:
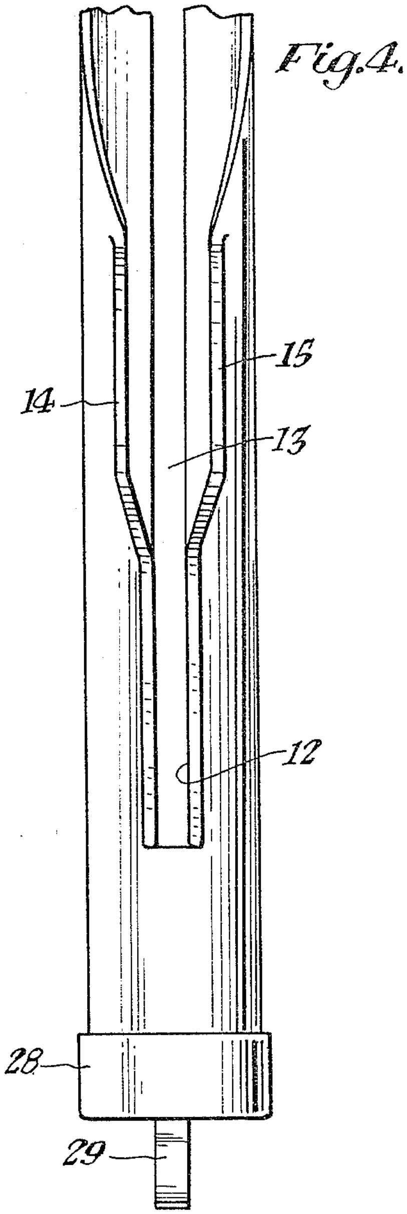
FIG. 4 is a front view of the tool.

FIG. 2 shows a top view of the open end of the cylindrical body 11. A cap 28 closes off the bottom of the cylinder as shown in FIGS. 1, 3, and 4. A notched disc-shaped connector means 29 extends downward from the bottom of cap 28. The disc 29 may be fitted into a suitable mating receiving means on the end of a long pole or switch stick (not shown). The connection via the notched disc 29 allows the tool to be angled in a variety of different positions relative to the pole. The cap 28 and disc 29 may be securely attached to the end of the body 11 by any suitable means or molded to the body as one piece. The operation of the tool is illustrated in FIGS. 5, 6, 7, 8 and 9. The drawings illustrate the fuse barrel in a generally horizontal position for convenience only. Normally the fuse barrel is positioned at a 60 degree angle to the horizontal. Fuses are electrically connected atop utility poles. The fuse wire is contained within cylindrical member or fuse barrel 40 that is in turn connected to fuse holder 39. The fuse barrel 40 is held in place in the fuse holder 39 by clips 41 and 42 which clamp the bulbus protuberances 43 and 44 which extend from the body of the fuse barrel 40. An unblown fuse in place in the fuse holder 40, not shown in a normal manner. When an electrical overload occurs, the fuse within the fuse barrel 40 burns out and causes a charge to ignite which creates a force on the end 45 of the fuse barrel to force the protuberances 43 and 44 out of and free of clips 41 and 42. Thus, the fuse holder 40 will hang down vertically on the connector bar 49 as shown in FIGS. 6, 7, and 8. The tool presented herein is capable of removing the fuse barrel and the end connector means from its blown or opened position for inspection or for replacement of the fuse. As set forth herein after, the tool may also be used to replace the fuse barrel and the end connector means, to close or open the electrical circuit by opening or closing the contacts 41 and 43.

Referring to FIG. 5, the tool 10 has been positioned on the end of a long pole (not shown) and the user has raised the tool up so that the generally U-shaped guide means composed of sections or portions 22 and 23 has been positioned on the fuse barrel 40 of the fuse holder 39. The guide means 22 and 23 allow the tool to be slid along the fuse barrel 40 in the direction of arrow S. The tool is slid until the head 21 of bolt 20 is adjacent to the ring 46 which is connected to and extending downwardly from the fuse barrel 40. The user then only has to twist the long pole (not shown) to turn the tool 10 approximately 10 degrees so that the head 21 of the bolt 20 automatically goes through the opening in ring 46. The user then pulls downward on the long pole and tool, pulling the protuberances 43 and 44 out of spring clips 41 and 42. The fuse barrel 40 then hangs down vertically as shown in FIG. 6 from hooks 47 and 48 via bar 49 which is connected to one end of fuse barrel 40. The fuse barrel is in the same position as it would hang if the fuse had blown and the fuse barrel moved downward of the holders or connectors. The tool 10 is then positioned directly below the vertically hanging fuse barrel 40 and raised upward by movement of the pole so that the body 11 of the tool may be moved up and over the fuse barrel. The tool is moved up to a position as shown in FIG. 6. The triangular guides 14 and 15 are useful in initially positioning the tool so that the ring 46 and protuberance 43 slide into the slots 12 and 13 in the body 11 of the tool. Now by simply lifting upward, the bar 49 can be lifted as shown in FIG. 8 from the hooks 47 and 48 thus completely detaching the fuse barrel 40 from the switch. The tool then may be lowered and the fuse within the fuse barrel may be examined and replaced if necessary.

The fuse barrel 40 is then placed back into the tool 10 and raised up so that the bar 49 as in FIG. 8 and laid back on the hook connectors. The tool is then lowered so that the fuse barrel 40 just slides out of the cylindrical body 11 of the tool. The pole and tool is then moved to the right and upwardly. The guide means 22 and 23 are positioned against the fuse barrel. As the upward force is applied and the guides are slid along the fuse barrel toward the end 45, the upward pressure will force the protuberances 43 and 44 back into the spring clamps 41 and 42 respectively to complete the closing of the circuit, as shown in FIG. 9.

Therefore, a single workman may easily open the fuse circuit, remove the fuse barrel and attachments for inspection, or replacement. This may be performed by one man without the aid of lifts or other expensive equipment.

The instant invention has been shown and described herein in what is considered to be the most practical and preferred embodiments. It is recognized, however, that departures may be made therefrom within the scope of the invention and that obvious modifications will occur to a person skilled in the art.

What I claims is:

1. A fuse barrel manipulation tool for utility pole fuse holders that holds a long fuse barrel having a fuse release ring, comprising:

a body having a cavity means for surrounding at least a portion of the long fuse barrel for holding the long fuse barrel to raise and lower the long fuse barrel from a utility pole fuse holder in a safe manner, said cavity means having an open end and a closed end, a guide means for use on the long fuse barrel to guide the tool toward a fuse release ring as the tool is slid along the fuse barrel, said guide means connected to said body adjacent to open end, a ring connecting means positioned and connected adjacent said guide means for insertion into the fuse ring by rotation of said body, whereby skill is not required to place the ring connecting means in the fuse ring located on a utility pole at a great distance from the user of the tool.

2. A fuse barrel manipulating tool as set forth in claim 1, wherein:

said guide means is generally U-shaped with arms projecting away from said body and upwardly from said body open end, said guide means constructed to freely slide along the long fuse barrel.

3. A fuse barrel manipulating tool as set forth in claim 2, wherein:

said ring connecting means is positioned above said open end and projects toward the longitudinal center line of said body cavity means.

4. A fuse barrel manipulation tool for utility pole fuse holders that include a removable long fuse barrel having a fuse release ring, comprising:

a body having a cavity therein for holding a long fuse barrel to raise and lower the long fuse barrel from a utility pole fuse holder in a safe manner, said cavity having an open end and a closed end, a guide means for use on the fuse barrel to guide the tool toward a fuse release ring as the tool is moved along the fuse barrel, said guide means connected to said body adjacent said open end, a ring connecting means positioned and connected adjacent said guide means for insertion into the fuse ring by rotation of said body, said guide means is generally U-shaped with arm projecting away from said body and upwardly from said open end, said ring connecting means is positioned above said open end and projects toward the longitudinal center line of said body cavity, said body having a first elongated opening in said body, said opening running from said open end toward said closed end, and having a second elongated opening in said body, said second opening being positioned directly opposite said first opening, said openings are for receiving the fuse release ring and a fuse barrel connector.

5. A fuse barrel manipulation tool for utility pole fuse holders that include a removable long fuse barrel having a fuse release ring, comprising:

a body having a cavity therein for holding a long fuse barrel to raise and lower the long fuse barrel from a utility pole fuse holder in a safe manner, said cavity having an open end and a closed end, a guide means for use on the fuse barrel to guide the tool toward a fuse release ring as the tool is moved along the fuse barrel, said guide means connected to said body adjacent said open end, a ring connecting means positioned and connected adjacent said guide means for insertion into the fuse ring by rotation of said body, said guide means is generally U-shaped with arms projecting away from said body and upwardly from said open end, said body is cylindrical body, said body having a first longitudinal opening running along at least the greater length of said body and having a second longitudinal opening opposite the first opening, said first longitudinal opening including outwardly projecting flanges for guiding a fuse member into said first longitudinal opening, said body includes a switch stick connector connected to said body.

6. A fuse barrel manipulation tool for opening a long fuse barrel having a fuse release ring at the end in a pole fuse holder, comprising:

a body including a long handle, a guide means for use on the long fuse barrel to guide the tool toward a fuse release ring as the tool is slid along the fuse barrel, said guide means connected to said body opposite said handle, and a ring connecting means positioned and connected adjacent said guide means for insertion into the fuse ring by rotation of said body when said guide means is positioned at the end of said barrel, whereby skill is not required to place the ring connecting means in the fuse ring located on a utility pole at a great distance from the user of the tool.

7. A fuse barrel manipulation tool for utility pole fuse holders that holds a long fuse barrel, comprising:

a body including a long handle, said body having a cavity means for surrounding at least a portion of the long fuse barrel for holding the long fuse barrel to raise the long fuse barrel and connect one end of the long fuse barrel to the utility pole fuse holder in a safe manner and to lower the long fuse barrel after unconnecting one end of the long fuse barrel from the utility pole fuse holder in a safe manner, said cavity means having an open end and a closed end, said closed end connected to said handle, a guide means for use on the long fuse barrel to guide the tool in order to quickly connect the other end of the long fuse barrel in the utility pole fuse holder, said guide means connected to said body adjacent said open end.

* * * * *